United States Patent
Yildiz et al.

(10) Patent No.: US 8,413,780 B2
(45) Date of Patent: Apr. 9, 2013

(54) DUAL CLUTCH FOR A TRANSMISSION HAVING MULTIPLE INPUT SHAFTS

(75) Inventors: Servet Yildiz, Gensingen (DE); Markus Haehle, Mainz (DE); James M. Partyka, Clarkston, MI (US); Robert Neil Paciotti, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 307 days.

(21) Appl. No.: 12/855,830

(22) Filed: Aug. 13, 2010

(65) Prior Publication Data

US 2011/0053697 A1  Mar. 3, 2011

Related U.S. Application Data

(60) Provisional application No. 61/237,100, filed on Aug. 26, 2009.

(51) Int. Cl.
| F16D 21/00 | (2006.01) |
| F16D 21/02 | (2006.01) |
| F16D 13/72 | (2006.01) |
| F16D 13/58 | (2006.01) |

(52) U.S. Cl.
USPC ................ 192/48.8; 192/48.603; 192/70.16; 192/70.13

(58) Field of Classification Search ................ 192/48.8, 192/48.603, 70.13, 70.16
See application file for complete search history.

(56) References Cited

U.S. PATENT DOCUMENTS

| 4,267,805 A * | 5/1981 | Schmuck .................. 123/198 E |
| 2008/0179157 A1* | 7/2008 | Zhou et al. .................. 192/48.1 |
| 2008/0257678 A1* | 10/2008 | Ari ................................ 192/112 |
| 2011/0259700 A1* | 10/2011 | Fenioux ..................... 192/70.16 |

* cited by examiner

*Primary Examiner* — David D Le
*Assistant Examiner* — Colby M Hansen

(57) ABSTRACT

A device for transmitting torque between a flywheel rotatably connected to an engine and a dual clutch transmission. The device includes a first substantially u-shaped member fixed to a perimeter of a dual clutch of the dual clutch transmission. The first substantially u-shaped member defines a slot having an open end. The second substantially u-shaped member is attached to a perimeter of the flywheel. The second substantially u-shaped member includes a support member for supporting an engagement member. The first substantially u-shaped member fits at least partially within the second substantially u-shaped member. The pair of bushings disposed proximate the engagement member between the first and second coupling members. The engagement member of the second substantially u-shaped member is configured to engage the open end of the slot of the first substantially u-shaped member and align the first substantially u-shaped member with the second substantially u-shaped member thereby transferring torque between the flywheel and the dual clutch transmission.

20 Claims, 3 Drawing Sheets

DUAL CLUTCH FOR A TRANSMISSION HAVING MULTIPLE INPUT SHAFTS

CROSS-REFERENCE TO RELATED APPLICATIONS

This application claims the benefit of U.S. Provisional Application No. 61/237,100, filed on Aug. 26, 2009, which is hereby incorporated in its entirety herein by reference.

TECHNICAL FIELD

The present disclosure relates to transmissions and more particularly to a dual clutch for a compact, dual clutch multiple speed transmission.

BACKGROUND

The statements in this section merely provide background information related to the present disclosure and may or may not constitute prior art.

A typical dual input multiple speed transmission has a first input shaft and a second input shaft that is a hollow sleeve shaft that is concentric with the first input shaft. The first and second input shafts are selectively coupled to the engine crankshaft through a dual clutch. The dual or twin clutch has two independent clutch units that are each separately rotationally fixed to one of the input shafts. The clutch units include friction elements that are axially compressed against friction elements that are ultimately rotationally fixed to the crankshaft. A dual clutch actuation device generates the apply force necessary to axially compress the friction elements and rotationally couple the input shafts with the crankshaft.

While current dual clutches achieve their intended purpose, the need for new and improved configurations which exhibit improved performance, is essentially constant. For example, one problem not addressed by the prior art is the relative movement between the flywheel and the dual clutch module. Accordingly, there is a need in the art for a dual clutch having improved torque transfer capability, packaging and ease of assembly while providing a mechanism to reduce or eliminate noise or vibration.

SUMMARY

The present invention provides a dual clutch for a dual clutch transmission. The transmission has two input shafts a first shaft and a second shaft that is a hollow sleeve shaft. The second shaft is concentric with the first shaft. The dual clutch has two clutch units that selectively couple a crankshaft of an engine to one of the two input shafts. More specifically, the dual clutch includes members such as a clutch housing having a first set of frictional elements that are rotationally fixed to the crankshaft through a flywheel and other members such hubs having a second set of frictional elements that are rotationally fixed to the input shafts. The first and second frictional elements are axially compressed against each other to couple one of the hubs to the dual clutch housing, thereby transmitting torque from the crankshaft to one of the input shafts. A dual clutch actuation device is provided to generate the axial compression force required to compress the first and second set of frictional elements. Dual clutch actuation device includes a first and second annular piston. The annular pistons include a first end that is in contact with annular bearing assemblies. The annular bearing assemblies are in contact with actuation levers that are in contact with the first set of frictional elements. The annular pistons are arranged in concentric annular piston slots. Together the piston and annular slots form annular piston chambers. The piston chambers are filled with hydraulic fluid. When the hydraulic fluid is pressurized the pistons slide out of the annular slots and apply a force on the actuation levers which in turn apply an axial compression force on the frictional elements.

In one aspect of the present invention, the dual clutch includes a first coupling member fixed to a center plate.

In another aspect of the present invention, the first coupling member of the dual clutch includes a slot having an opening that opposes the flywheel.

In another aspect of the present invention, the flywheel includes a second coupling member fixedly attached to a periphery of the flywheel wherein the second coupling member opposes the first coupling member of the dual clutch.

In yet another aspect of the present invention, the second coupling member includes a pin that is configured for engagement with the slot in the first coupling member.

In yet another aspect of the present invention, the second coupling member includes angled flanges that facilitate engagement of the second coupling member with the first coupling member.

The above features and advantages and other features and advantages of the present invention are readily apparent from the following detailed description of the best modes for carrying out the invention when taken in connection with the accompanying drawings.

DESCRIPTION

Figure 1:
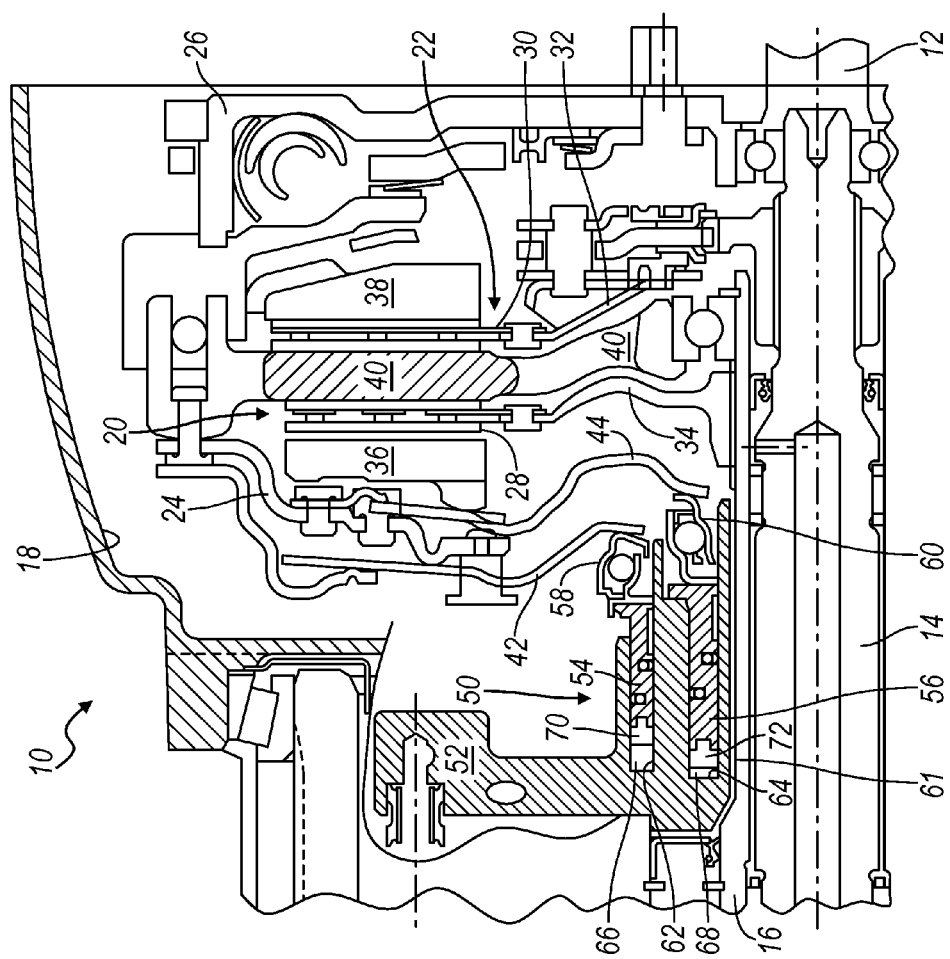
FIG. 1 is a partial cross-sectional view of a torque transmitting device, actuation device and flywheel for a dual input transmission, in accordance with an embodiment of the present invention.

Referring to FIG. 1, a partial cross-sectional view of a torque transmitting device for a dual input transmission (not shown) is generally indicated by reference number 10. The torque transmitting device 10 is for example a dual clutch disposed in a vehicle powertrain. Typically the vehicle powertrain includes an engine and a transmission. In the instant embodiment the transmission is a dual input transmission where torque is transferred through selective operation of torque transmitting device 10 from the engine via a crankshaft 12 to two input shafts in the transmission: a first input shaft 14 and a second input shaft 16. The second input shaft 16 is a sleeve (or hollow) shaft that is concentric with and overlies the first input shaft 14. Torque transmitting device 10 is disposed in a transmission housing or bell housing 18

Torque transmitting device 10 has two separate and independent friction clutches 20 and 22 disposed in a clutch housing 24. Clutch housing 24 is rotationally fixed to a flywheel 26, as will be described in further detail below. Flywheel 26 is connected to crankshaft 12 and is preferably a dual mass flywheel that is configured to dampen and reduce vibration in the crankshaft 12. Friction clutch 20 includes a friction member 28 and friction clutch 22 includes a friction member 30. Friction member 28 is fixed to a hub member 34.

Friction member 30 is fixed to a hub member 32. Hub members 32 and 34 are each separately rotationally fixed to first and second input shafts 14 and 16, respectively. Clutch housing 24 also includes friction elements 36, 38 and a clutch center plate 40 that are each attached and rotationally fixed to housing 24. Friction members 28, 30, clutch center plate 40 and friction elements 36 and 38 are configured to form a friction clutch, as is known in the art as a dual clutch. Thus, selective engagement through axial compression of friction member 28 with friction element 36 and clutch center plate 40 connects the crankshaft 12 for common rotation with the second input shaft 16. Selective engagement of friction member 30 with friction element 38 and clutch center plate 40 connects the crankshaft 12 for common rotation with the first input shaft 14. Friction clutches 20 and 22 may include multiple friction members 28 and 30 that interact with a respective multiple of friction elements 36 and 38 connected to housing 24. The number and size of the friction members will vary based on appropriate torque transmission requirements. Of course, the torque transmission capability of device 10 may be varied by varying the number of friction elements and amount of surface area of each friction element.

The coupling of the crankshaft 12 to the input shafts 14 and 16 is achieved through axial compression of the friction elements and clutch center plate 40 by actuation levers 42 and 44. Actuation levers 42, 44 have a first end 46 that is in contact with and configured to pivot on housing 24. The second ends 48 of actuation levers 42, 44 are in contact with and configured to receive an apply force generated by an actuation device 50.

With continuing reference to FIG. 1, actuation device 50 includes an annular housing 52, a pair of annular pistons 54 and 56 and a pair of bearing assemblies 58 and 60. Housing 52 is mounted and thus rotationally fixed to bell housing 18 and defines a central bore 61, a pair of annular slots 62 and 64. The central bore 61 is sized to allow the first input shaft 14 and the second input shaft 16 to pass there through. Annular slot 62 is concentric with and disposed radially inward of annular slot 64. The annular pistons 54 and 56 are configured to slide axially within the slots and form piston chambers 66 and 68 therewith. Annular pistons 54 and 56 further include seals 70 and 72, respectively, fixed to an end of pistons 54 and 56. Seals 70 and 72 are configured to prevent excessive leakage of hydraulic fluid between a wall of the piston chambers 66 and 68 and the ends of the pistons. Piston chambers 66 and 68 are filled with hydraulic fluid through clutch feed bores (not shown). Bearing assemblies 58 and 60 are actuation bearings that torsionally decouple the rotating elements of clutch 10 (i.e. housing 24 and actuation levers 42 and 44) from the non-rotating members of the actuation device 50 (i.e. pistons 54 and 56).

In operation hydraulic fluid is pressurized and forced through clutch feed bores to push pistons 54 and 56 out of their respective piston chambers 66 and 68 towards levers 42 and 44. More specifically, pressurized hydraulic fluid is pushed through the clutch feed bore into piston chamber 66 forcing annular piston 54 to slide out of the chamber towards lever 42. As annular piston 56 moves out of the chamber 66, bearing assembly 58 that is in contact with annular piston 54 applies a force to one end of the actuation lever 42. Actuation lever 42 in turn compresses friction element 38 axially against friction member 32 and center plate 40 causing friction member 32 to rotate at substantially the same speed as friction element 38. Thus, selectively rotationally coupling crankshaft 12 with first input shaft 14. Similarly, pressurized hydraulic fluid is pushed through clutch feed bores into chamber 68 forcing annular piston 56 to slide out of the chamber 68 towards lever 44. As annular piston 56 moves out of the chamber 68, bearing assembly 60 that is in contact with annular piston 56 applies a force to one end of the actuation lever 44. Actuation lever 44 in turn compresses friction element 36 axially against friction member 28 and center plate 40 causing friction member 28 to rotate at substantially the same speed as friction element 36 and center plate 40. Thus, selectively rotationally coupling crankshaft 12 with second input shaft 16.

Figure 2:
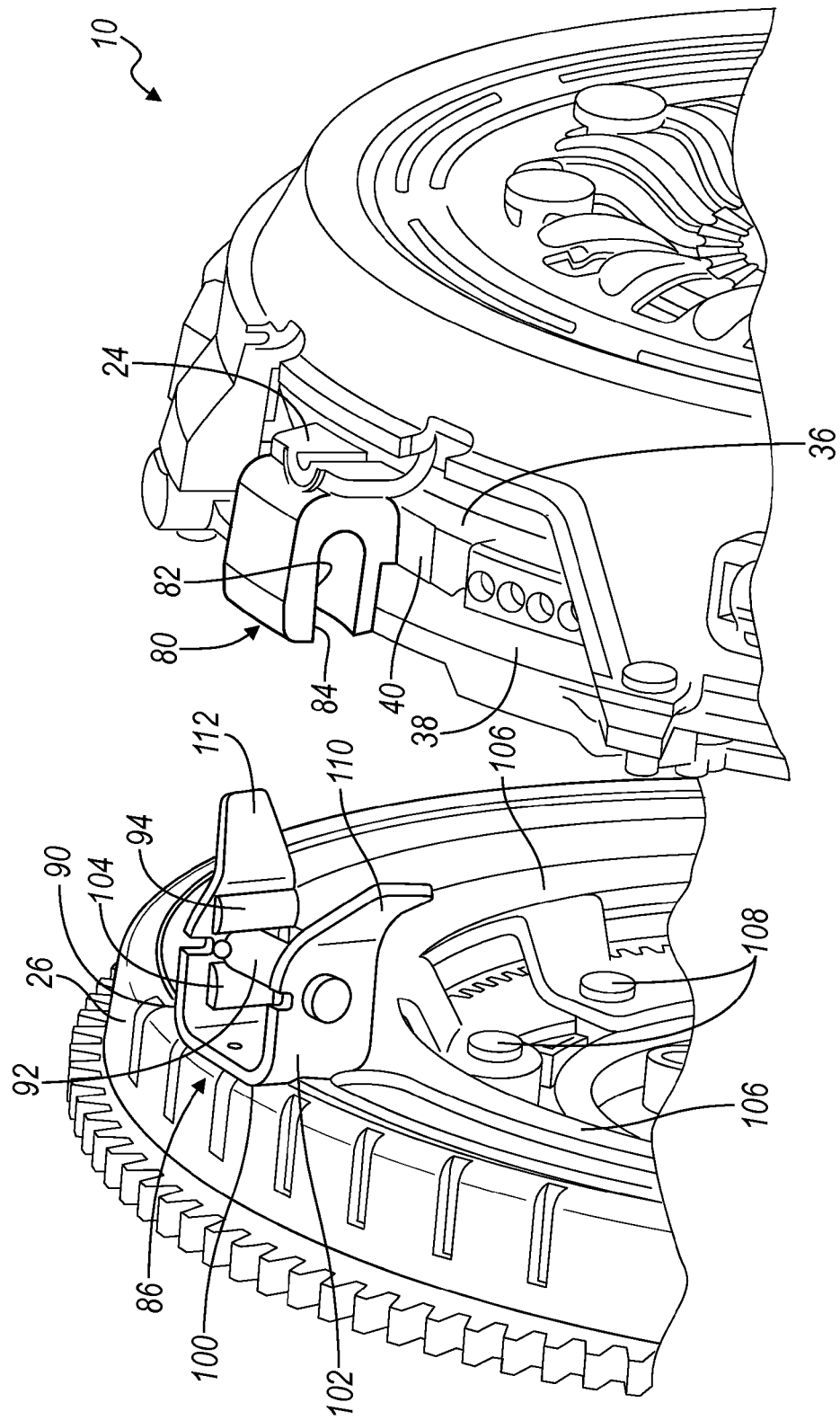
FIG. 2 is a perspective view of the torque transmitting device and the flywheel shown FIG. 1, in accordance with an embodiment of the present invention.
Figure 3:
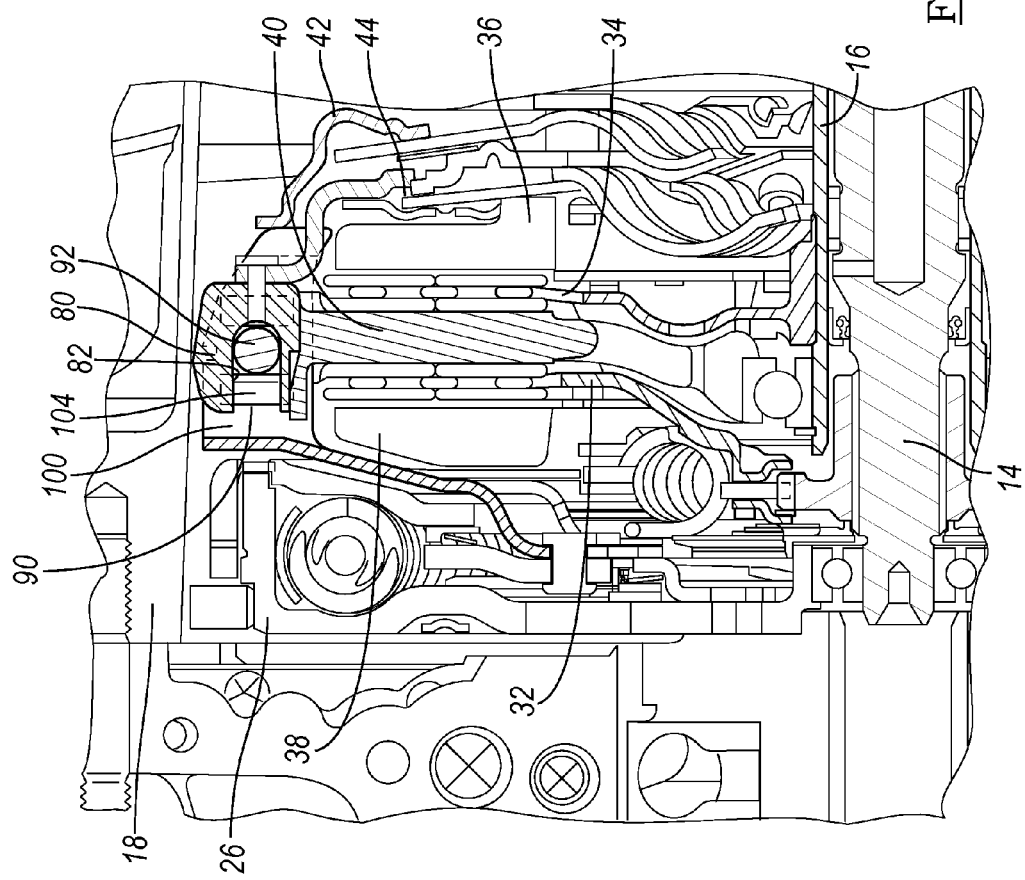
FIG. 3 is a partial cross-sectional view of first and second coupling members for rotationally coupling the torque transmitting device to the flywheel, in accordance with an embodiment of the present invention.

Referring now to FIGS. 2 and 3, a perspective partial view and partial cross-sectional view of the flywheel and torque transmitting device 10 are illustrated, in accordance with an embodiment of the present invention. As illustrated the center clutch plate 40 includes a tab or first coupling member 80 formed in or fixed to a perimeter of plate 40. Tab 80 defines a "u-shaped" slot 82 that has an open end 84. Open end 84 opposes or is open to a second coupling member 86 attached to flywheel 26. In the instant embodiment, three first coupling members 80 are disposed at equal distances around a periphery of plate 40. However, the present invention contemplates that in alternate embodiments additional first coupling members are disposed at equal distances around a periphery of plate 40.

The second coupling member 86 attached to flywheel 26 includes a bracket 90, a pin 92 and a bushing 94. Bracket 90 has a base 100 and a pair of projecting flange members 102 and 104. Base 100 is attached or formed integral with a ring 106. Ring 106 is secured by fasteners 108 to flywheel 26. Thus, bracket 90 is configured for common rotation with flywheel 26. In the instant embodiment, three second coupling members 86 are disposed at equal distances around a periphery of ring 106 opposite first coupling members 80. However, the present invention contemplates that in alternate embodiments additional second coupling members are disposed at equal distances around a periphery of ring 106. Projecting flange members 102 and 104 are attached to base 100 at substantially a 90 degree angle. Flange members 102 and 104 have ends 110 and 112 remote from base 100 that are angled relative to the base at an angle substantially greater than 90 degrees. Flange members 102 and 104 further include apertures configured to receive pin 92. Pin 92 is sized to fit within slot 82 of first coupling member 80. Bushings 94 (only one shown) are disposed on pin 92 adjacent each flange member 102 and 104. Bushings 94 are configured to reduce or eliminate the space between the sides of first coupling member 80 and second coupling member 86 when the coupling members are in a mating relationship as described below.

As shown in FIGS. 1 and 3, torque transmitting device 10 is coupled for common rotation with flywheel 26 through mating engagement of first coupling member 80 with second coupling member 86. Torque transmitting device 10 is brought into quick and secure engagement with flywheel 26 through axial translation of torque transmitting device 10 towards flywheel 26. More specifically, as device 10 is axially translated pin 92 of second coupling member 86 is inserted into opening 84 of slot 82 of first coupling member 80. The distance between flanges 102 and 104 and the thickness of bushings 94 are sized to substantially match the outside dimensions of first coupling member 80 such that relative rotational movement of the first and second coupling is reduced or eliminated.

While the best modes for carrying out the invention have been described in detail, those familiar with the art to which this invention relates will recognize various alternative designs and embodiments for practicing the invention within the scope of the appended claims.

The invention claimed is:

1. A device for transmitting torque between a flywheel rotatably connected to an engine and a dual clutch transmission, the device comprising:
   a first coupling member fixed to a perimeter of a dual clutch of the dual clutch transmission, wherein the first coupling member defines a slot having an open end; and
   a second coupling member attached to a perimeter of the flywheel, wherein the second coupling member includes a support member for supporting an engagement member, and
   wherein the engagement member of the second coupling member is configured to engage the open end of the slot of the first coupling member and align the first coupling member with the second coupling member thereby transferring torque between the flywheel and the dual clutch transmission.

2. The device of claim 1, wherein the support member has a base and a pair of flange members projecting from the base.

3. The device of claim 2, wherein the base and the pair of flange members of the support member form a u-shaped bracket.

4. The device of claim 3, wherein the pair of flange members include a first flange portion perpendicular to the base and a second flange portion projecting from the first flange portion at an angle greater than 90 degrees relative to the base.

5. The device of claim 1, wherein the engagement member is a pin that is sized to fit within the slot of the first coupling member.

6. The device of claim 1, further comprising a pair of bushings disposed proximate the engagement member between the first and second coupling members.

7. The device of claim 6, wherein the pair of bushings are sized to fill a space between the first and second coupling members to transfer torque between the first and second coupling members.

8. The device of claim 1, wherein three first coupling members are disposed at equal distances around the perimeter of the dual clutch.

9. The device of claim 8, wherein three second coupling members are disposed at equal distances around the perimeter of the flywheel.

10. The device of claim 1, wherein the first and second coupling members are configured to allow axial movement of the dual clutch relative to the flywheel.

11. The device of claim 10, wherein the first coupling member is attached to a housing of the dual clutch.

12. A device for transmitting torque between a flywheel rotatably connected to an engine and a dual clutch transmission, the device comprising:
   a first substantially u-shaped member fixed to a perimeter of a dual clutch of the dual clutch transmission, wherein the first substantially u-shaped member defines a slot having an open end;
   a second substantially u-shaped member attached to a perimeter of the flywheel, wherein the second substantially u-shaped member includes a support member for supporting an engagement member and wherein the first substantially u-shaped member fits at least partially within the second substantially u-shaped member; and
   a pair of bushings disposed proximate the engagement member between the first and second substantially u-shaped members, and
   wherein the engagement member of the second substantially u-shaped member is configured to engage the open end of the slot of the first substantially u-shaped member and align the first substantially u-shaped member with the second substantially u-shaped member thereby transferring torque between the flywheel and the dual clutch transmission.

13. The device of claim 12, wherein the support member has a base and a pair of flange members projecting from the base.

14. The device of claim 13, wherein the base and the pair of flange members of the support member form a u-shaped bracket.

15. The device of claim 14, wherein the pair of flange members include a first flange portion perpendicular to the base and a second flange portion projecting from the first flange portion at an angle greater than 90 degrees relative to the base.

16. The device of claim 12, wherein the engagement member is a pin that is sized to fit within the slot of the first substantially u-shaped member.

17. The device of claim 16, wherein the pair of bushings are sized to fill a space between the first and second substantially u-shaped members to transfer torque between the first and second substantially u-shaped members.

18. The device of claim 12, wherein three first substantially u-shaped members are disposed at equal distances around the perimeter of the dual clutch.

19. The device of claim 18, wherein three second substantially u-shaped members are disposed at equal distances around the perimeter of the flywheel.

20. The device of claim 12, wherein the first and second substantially u-shaped members are configured to allow axial movement of the dual clutch relative to the flywheel.

* * * * *